United States Patent
Edwards et al.

(10) Patent No.: US 9,292,153 B1
(45) Date of Patent: Mar. 22, 2016

(54) SYSTEMS AND METHODS FOR PROVIDING EFFICIENT AND FOCUSED VISUALIZATION OF DATA

(71) Applicants: William Scott Edwards, San Jose, CA (US); Teresa Aguilera, San Francisco, CA (US)

(72) Inventors: William Scott Edwards, San Jose, CA (US); Teresa Aguilera, San Francisco, CA (US)

(73) Assignee: Axcient, Inc., Mountain View, CA (US)

( * ) Notice: Subject to any disclaimer, the term of this patent is extended or adjusted under 35 U.S.C. 154(b) by 73 days.

(21) Appl. No.: 13/789,578

(22) Filed: Mar. 7, 2013

(51) Int. Cl.
*G06F 3/00* (2006.01)
*G06F 3/048* (2013.01)
*G06F 3/0481* (2013.01)
*G06F 3/01* (2006.01)
*G06F 9/44* (2006.01)

(52) U.S. Cl.
CPC .............. *G06F 3/048* (2013.01); *G06F 3/0481* (2013.01); *G06F 8/38* (2013.01); *G06F 9/4443* (2013.01)

(58) Field of Classification Search
CPC ..... G06F 3/048; G06F 3/0481; G06F 9/4443; G06F 8/38
USPC .......................................... 715/762, 786, 810
See application file for complete search history.

(56) References Cited

U.S. PATENT DOCUMENTS

| | | |
|---|---|---|
| 5,574,905 A | 11/1996 | deCarmo |
| 6,122,629 A | 9/2000 | Walker et al. |
| 5,205,527 A1 | 3/2001 | Goshey et al. |
| 6,233,589 B1 | 5/2001 | Balcha et al. |
| 6,272,492 B1 | 8/2001 | Kay |
| 6,411,985 B1 | 6/2002 | Fujita et al. |
| 6,604,236 B1 | 8/2003 | Draper et al. |
| 6,629,110 B2 | 9/2003 | Cane et al. |
| 6,651,075 B1 | 11/2003 | Kusters et al. |
| 6,971,018 B1 | 11/2005 | Witt et al. |
| 7,024,581 B1 | 4/2006 | Wang et al. |
| 7,085,904 B2 | 8/2006 | Mizuno et al. |
| 7,266,655 B1 | 9/2007 | Escabi, II et al. |
| 7,401,192 B2 | 7/2008 | Stakutis et al. |
| 7,406,488 B2 | 7/2008 | Stager et al. |
| 7,546,323 B1 | 6/2009 | Timmins et al. |
| 7,620,765 B1 | 11/2009 | Ohr et al. |
| 7,647,338 B2 * | 1/2010 | Lazier et al. ........... 707/999.102 |
| 7,676,763 B2 * | 3/2010 | Rummel ........................ 715/841 |
| 7,730,425 B2 * | 6/2010 | de los Reyes et al. ........ 715/835 |
| 7,743,038 B1 | 6/2010 | Goldick |
| 7,752,487 B1 | 7/2010 | Feeser et al. |
| 7,769,731 B2 | 8/2010 | O'Brien |
| 7,797,582 B1 | 9/2010 | Stager et al. |
| 7,809,688 B2 | 10/2010 | Cisler et al. |
| 7,832,008 B1 | 11/2010 | Kraemer |

(Continued)

OTHER PUBLICATIONS

Non-Final Office Action, Mar. 30, 2015, U.S. Appl. No. 13/030,073, filed Feb. 17, 2011.

(Continued)

*Primary Examiner* — Nicholas Augustine
(74) *Attorney, Agent, or Firm* — Carr & Ferrell LLP

(57) ABSTRACT

Systems and methods for providing efficient and focused visualization of data are provided herein. An exemplary method may include determining a default view layout for a user, the default view layout including representations of table records for the user, the default view layout and representations are selected based upon a table record count for the user, generating a graphical user interface having the selected default view layout, and providing the graphical user interface to a display device.

18 Claims, 8 Drawing Sheets

(56) References Cited

U.S. PATENT DOCUMENTS

| | | | |
|---|---|---|---|
| 7,844,850 B2 | 11/2010 | Yasuzato | |
| 7,873,601 B1 | 1/2011 | Kushwah | |
| 7,930,275 B2 | 4/2011 | Chen et al. | |
| 7,966,293 B1 | 6/2011 | Owara et al. | |
| 8,037,345 B1 | 10/2011 | Iyer et al. | |
| 8,046,632 B2 | 10/2011 | Miwa et al. | |
| 8,060,476 B1 | 11/2011 | Afonso et al. | |
| 8,099,391 B1 | 1/2012 | Monckton | |
| 8,099,572 B1 | 1/2012 | Arora et al. | |
| 8,117,163 B2 | 2/2012 | Brown et al. | |
| 8,200,926 B1 | 6/2012 | Stringham | |
| 8,224,935 B1 | 7/2012 | Bandopadhyay et al. | |
| 8,244,914 B1 | 8/2012 | Nagarkar | |
| 8,245,156 B2* | 8/2012 | Mouilleseaux et al. | 715/834 |
| 8,260,742 B2 | 9/2012 | Cognigni et al. | |
| 8,279,174 B2* | 10/2012 | Jee et al. | 345/157 |
| 8,296,410 B1 | 10/2012 | Myhill et al. | |
| 8,321,688 B2 | 11/2012 | Auradkar et al. | |
| 8,332,442 B1 | 12/2012 | Greene | |
| 8,352,717 B2 | 1/2013 | Campbell et al. | |
| 8,381,133 B2* | 2/2013 | Iwema et al. | 715/845 |
| 8,402,087 B2 | 3/2013 | O'Shea et al. | |
| 8,407,190 B2 | 3/2013 | Prahlad et al. | |
| 8,412,680 B1 | 4/2013 | Gokhale et al. | |
| 8,504,785 B1 | 8/2013 | Clifford et al. | |
| 8,549,432 B2* | 10/2013 | Warner | 715/834 |
| 8,572,337 B1 | 10/2013 | Gokhale et al. | |
| 8,589,350 B1 | 11/2013 | Lalonde et al. | |
| 8,589,913 B2 | 11/2013 | Jelvis et al. | |
| 8,600,947 B1 | 12/2013 | Freiheit et al. | |
| 8,601,389 B2* | 12/2013 | Schulz et al. | 715/786 |
| 8,606,752 B1 | 12/2013 | Beatty et al. | |
| 8,639,917 B1 | 1/2014 | Ben-Shaul et al. | |
| 8,676,273 B1 | 3/2014 | Fujisaki | |
| 8,886,611 B2 | 11/2014 | Caputo | |
| 8,924,360 B1 | 12/2014 | Caputo | |
| 8,954,544 B2 | 2/2015 | Edwards | |
| 9,104,621 B1 | 8/2015 | Caputo | |
| 9,213,607 B2 | 12/2015 | Lalonde et al. | |
| 2001/0034737 A1 | 10/2001 | Cane et al. | |
| 2001/0056503 A1 | 12/2001 | Hibbard | |
| 2002/0169740 A1 | 11/2002 | Korn | |
| 2003/0011638 A1* | 1/2003 | Chung | 345/808 |
| 2003/0158873 A1 | 8/2003 | Sawdon et al. | |
| 2003/0208492 A1 | 11/2003 | Winiger et al. | |
| 2004/0044707 A1 | 3/2004 | Richard | |
| 2004/0073560 A1 | 4/2004 | Edwards | |
| 2004/0093474 A1 | 5/2004 | Lin et al. | |
| 2004/0233924 A1 | 11/2004 | Bilak et al. | |
| 2004/0260973 A1 | 12/2004 | Michelman | |
| 2005/0010835 A1 | 1/2005 | Childs et al. | |
| 2005/0027748 A1 | 2/2005 | Kisley | |
| 2005/0154937 A1 | 7/2005 | Achiwa | |
| 2005/0171979 A1 | 8/2005 | Stager et al. | |
| 2005/0223043 A1 | 10/2005 | Randal et al. | |
| 2005/0278583 A1 | 12/2005 | Lennert et al. | |
| 2005/0278647 A1* | 12/2005 | Leavitt et al. | 715/765 |
| 2006/0013462 A1* | 1/2006 | Sadikali | 382/132 |
| 2006/0047720 A1 | 3/2006 | Kulkarni et al. | |
| 2006/0064416 A1 | 3/2006 | Sim-Tang | |
| 2006/0224636 A1 | 10/2006 | Kathuria et al. | |
| 2007/0033301 A1 | 2/2007 | Aloni et al. | |
| 2007/0112895 A1 | 5/2007 | Ahrens et al. | |
| 2007/0176898 A1* | 8/2007 | Suh | 345/158 |
| 2007/0180207 A1 | 8/2007 | Garfinkle | |
| 2007/0204166 A1 | 8/2007 | Tome et al. | |
| 2007/0208918 A1 | 9/2007 | Harbin et al. | |
| 2007/0220029 A1 | 9/2007 | Jones et al. | |
| 2007/0226400 A1 | 9/2007 | Tsukazaki | |
| 2007/0233699 A1 | 10/2007 | Taniguchi et al. | |
| 2007/0250302 A1 | 10/2007 | Xu et al. | |
| 2007/0260842 A1 | 11/2007 | Faibish et al. | |
| 2007/0276916 A1 | 11/2007 | McLoughlin et al. | |
| 2007/0283017 A1 | 12/2007 | Anand et al. | |
| 2007/0283343 A1 | 12/2007 | Aridor et al. | |
| 2007/0288525 A1 | 12/2007 | Stakutis et al. | |
| 2007/0288533 A1 | 12/2007 | Srivastava et al. | |
| 2007/0294321 A1 | 12/2007 | Midgley et al. | |
| 2008/0005468 A1 | 1/2008 | Faibish et al. | |
| 2008/0010422 A1 | 1/2008 | Suzuki et al. | |
| 2008/0027998 A1 | 1/2008 | Hara | |
| 2008/0036743 A1* | 2/2008 | Westerman et al. | 345/173 |
| 2008/0082310 A1 | 4/2008 | Sandorfi et al. | |
| 2008/0141018 A1 | 6/2008 | Tanaka et al. | |
| 2008/0162590 A1 | 7/2008 | Kundu et al. | |
| 2008/0162607 A1 | 7/2008 | Torii et al. | |
| 2008/0201315 A1* | 8/2008 | Lazier et al. | 707/5 |
| 2008/0229050 A1 | 9/2008 | Tillgren | |
| 2008/0307345 A1 | 12/2008 | Hart et al. | |
| 2008/0307527 A1 | 12/2008 | Kaczmarski et al. | |
| 2009/0164527 A1 | 6/2009 | Spektor et al. | |
| 2009/0185500 A1 | 7/2009 | Mower et al. | |
| 2009/0216973 A1 | 8/2009 | Nakajima et al. | |
| 2009/0309849 A1* | 12/2009 | Iwema et al. | 345/173 |
| 2009/0319653 A1 | 12/2009 | Lorenz et al. | |
| 2009/0327964 A1* | 12/2009 | Mouilleseaux et al. | 715/834 |
| 2010/0077165 A1 | 3/2010 | Lu et al. | |
| 2010/0095077 A1 | 4/2010 | Lockwood | |
| 2010/0104105 A1 | 4/2010 | Schmidt et al. | |
| 2010/0107155 A1 | 4/2010 | Banerjee et al. | |
| 2010/0114832 A1 | 5/2010 | Lillibridge et al. | |
| 2010/0165947 A1 | 7/2010 | Taniuchi et al. | |
| 2010/0179973 A1 | 7/2010 | Carruzzo | |
| 2010/0192103 A1* | 7/2010 | Cragun et al. | 715/834 |
| 2010/0205152 A1 | 8/2010 | Ansari et al. | |
| 2010/0228999 A1 | 9/2010 | Maheshwari et al. | |
| 2010/0235831 A1 | 9/2010 | Dittmer | |
| 2010/0262637 A1 | 10/2010 | Akagawa et al. | |
| 2010/0268689 A1 | 10/2010 | Gates et al. | |
| 2010/0318748 A1 | 12/2010 | Ko et al. | |
| 2010/0332454 A1 | 12/2010 | Prahlad et al. | |
| 2011/0041004 A1 | 2/2011 | Miwa et al. | |
| 2011/0047405 A1 | 2/2011 | Marowsky-Bree et al. | |
| 2011/0055399 A1 | 3/2011 | Tung et al. | |
| 2011/0055471 A1 | 3/2011 | Thatcher et al. | |
| 2011/0055500 A1 | 3/2011 | Sasson et al. | |
| 2011/0082998 A1 | 4/2011 | Boldy et al. | |
| 2011/0106768 A1 | 5/2011 | Khanzode et al. | |
| 2011/0154268 A1* | 6/2011 | Trent et al. | 715/863 |
| 2011/0218966 A1 | 9/2011 | Barnes et al. | |
| 2011/0238937 A1 | 9/2011 | Murotani et al. | |
| 2011/0264785 A1 | 10/2011 | Newman et al. | |
| 2011/0265143 A1 | 10/2011 | Grube et al. | |
| 2012/0013540 A1* | 1/2012 | Hogan | 345/173 |
| 2012/0065802 A1 | 3/2012 | Seeber et al. | |
| 2012/0084501 A1 | 4/2012 | Watanabe et al. | |
| 2012/0124307 A1 | 5/2012 | Ashutosh et al. | |
| 2012/0130956 A1 | 5/2012 | Caputo | |
| 2012/0131235 A1 | 5/2012 | Nageshappa et al. | |
| 2012/0179655 A1 | 7/2012 | Beatty et al. | |
| 2012/0204060 A1 | 8/2012 | Swift et al. | |
| 2012/0210398 A1 | 8/2012 | Triantafillos et al. | |
| 2013/0018946 A1 | 1/2013 | Brown et al. | |
| 2013/0024426 A1 | 1/2013 | Flowers et al. | |
| 2013/0036095 A1 | 2/2013 | Titchener et al. | |
| 2013/0091183 A1 | 4/2013 | Edwards et al. | |
| 2013/0091471 A1* | 4/2013 | Gutt et al. | 715/848 |
| 2013/0166511 A1 | 6/2013 | Ghatty et al. | |
| 2013/0238752 A1 | 9/2013 | Park et al. | |
| 2013/0318046 A1 | 11/2013 | Clifford et al. | |
| 2014/0006858 A1 | 1/2014 | Helfman et al. | |
| 2014/0032498 A1 | 1/2014 | Lalonde et al. | |
| 2014/0047081 A1 | 2/2014 | Edwards | |
| 2014/0053022 A1 | 2/2014 | Forgette et al. | |
| 2014/0089619 A1 | 3/2014 | Khanna et al. | |
| 2014/0149358 A1 | 5/2014 | Aphale et al. | |
| 2014/0189680 A1 | 7/2014 | Kripalani | |
| 2014/0303961 A1* | 10/2014 | Leydon et al. | 704/2 |
| 2015/0046404 A1 | 2/2015 | Caputo | |
| 2015/0095691 A1 | 4/2015 | Edwards | |

OTHER PUBLICATIONS

Final Office Action, Feb. 24, 2015, U.S. Appl. No. 13/671,498, filed Nov. 7, 2012.

(56) References Cited

OTHER PUBLICATIONS

Non-Final Office Action, Feb. 10, 2015, U.S. Appl. No. 13/789,565, filed Mar. 7, 2013.
Final Office Action, Apr. 1, 2015, U.S. Appl. No. 14/037,231, filed Sep. 25, 2013.
Non-Final Office Action, Jun. 17, 2015, U.S. Appl. No. 13/889,164, filed May 7, 2013.
Advisory Action, May 12, 2015, U.S. Appl. No. 13/671,498, filed Nov. 7, 2012.
Advisory Action, Jun. 10, 2015, U.S. Appl. No. 13/671,498, filed Nov. 7, 2012.
Non-Final Office Action, May 20, 2015, U.S. Appl. No. 13/633,695, filed Oct. 2, 2012.
Final Office Action, May 27, 2015, U.S. Appl. No. 13/789,565, filed Mar. 7, 2013.
Advisory Action, Jun. 10, 2015, U.S. Appl. No. 14/037,231, filed Sep. 25, 2013.
Non-Final Office Action, Jul. 9, 2015, U.S. Appl. No. 14/037,231, filed Sep. 25, 2013.
Notice of Allowance, Jun. 5, 2015, U.S. Appl. No. 14/534,017, filed Nov. 5, 2014.
Non-Final Office Action, Jul. 27, 2015, U.S. Appl. No. 14/564,082, filed Dec. 8, 2014.
Li et al., "Efficient File Replication," U.S. Appl. No. 13/671,498, filed Jul. 24, 2015.
Office Action, Apr. 10, 2014, U.S. Appl. No. 13/570,161, filed Aug. 8, 2012.
Notice of Allowance, Sep. 26, 2014, U.S. Appl. No. 12/895,275, filed Sep. 30, 2010.
Non-Final Office Action, Oct. 1, 2014, U.S. Appl. No. 13/030,073, filed Feb. 17, 2011.
Notice of Allowance, Sep. 15, 2014, U.S. Appl. No. 13/363,234, filed Jan. 31, 2012.
Notice of Allowance, Oct. 20, 2014, U.S. Appl. No. 13/570,161, filed Aug. 8, 2012.
Non-Final Office Action, Jul. 28, 2014, U.S. Appl. No. 13/671,498, filed Nov. 7, 2012.
Final Office Action, May 20, 2014, U.S. Appl. No. 13/633,695, filed Oct. 2, 2012.
Non-Final, Jun. 19, 2013, U.S. Appl. No. 13/030,073, filed Feb. 17, 2011.
Final, Jun. 24, 2013, U.S. Appl. No. 13/437,738, filed Apr. 2, 2012.
Corrected Notice of Allowability, Nov. 3, 2014, U.S. Appl. No. 13/570,161, filed Aug. 8, 2012.
Corrected Notice of Allowability, Dec. 30, 2014, U.S. Appl. No. 13/570,161, filed Aug. 8, 2012.
Non-Final Office Action, Nov. 12, 2014, U.S. Appl. No. 14/037,231, filed Sep. 25, 2013.
Caputo, "Systems and Methods for Restoring a File", U.S. Appl. No. 12/895,275, filed Sep. 30, 2010.
Non-Final, Feb. 19, 2013, U.S. Appl. No. 13/437,738, filed Apr. 2, 2012.
Non-Final, Jul. 24, 2012, U.S. Appl. No. 13/363,234, filed Jan. 31, 2012.
Non-Final, Apr. 30, 2013, U.S. Appl. No. 13/363,234, filed Jan. 31, 2012.
Non-Final, Feb. 14, 2012, U.S. Appl. No. 12/895,275, filed Sep. 30, 2010.
Final, Dec. 27, 2012, U.S. Appl. No. 12/895,275, filed Sep. 30, 2010.
Notice of Allowance, Oct. 22, 2015, U.S. Appl. No. 13/030,073, Feb. 17, 2011.
Non-Final Office Action, Oct. 30, 2015, U.S. Appl. No. 13/789,565, filed Mar. 7, 2013.
Notice of Allowance, Sep. 8, 2015, U.S. Appl. No. 14/037,231, filed Sep. 25, 2013.

* cited by examiner

SYSTEMS AND METHODS FOR PROVIDING EFFICIENT AND FOCUSED VISUALIZATION OF DATA

FIELD OF THE PRESENT TECHNOLOGY

The present technology relates generally to systems and methods for providing efficient and focused visualization of data. The present technology may intelligently select a preferred default view layout for a user based upon their data. Additionally, the present technology provides intuitive and focused graphical user interfaces that provide intuitive layouts of data.

BACKGROUND

Traditional representations of data, such as data records stored in a database, are often cumbersome and lack intuitiveness, especially relative to the viewer. For example, data objects stored in a database may include pluralities of individual parameters that provide detailed information about the object. When displaying these objects in a table format, a common representation includes an ordered list of objects that may be sorted or otherwise processed for display. Table records are displayed in row format such and similar parameters of table records are organized in columns. When objects possess many individual parameters, the column format can become overwhelming. Additionally, when the database includes more objects than can be shown in the field of view of the UI, the user must typically navigate through pages of table records to view these additional objects. Clicking through pages can cause the user to lose visual context. Moreover, objects not shown in the immediate field of view may be ignored or their impact may be reduced due to the fact that the objects are not top of mind to the user. Data that is not easy to navigate and visually apprehend may be rendered meaningless to the viewer. Additionally, traditional table representations are ill suited to view switching, where the user can easily transition between representations of their data, such as list, index card view, and so forth.

SUMMARY OF THE PRESENT TECHNOLOGY

According to some embodiments, the present technology may be directed to methods that comprise: (a) determining a default view layout for a user, the default view layout comprising representations of table records for the user, the default view layout and representations are selected based upon a table record count for the user; (b) generating a graphical user interface having the selected default view layout; and (c) providing the graphical user interface to a display device.

According to some embodiments, the present technology may be directed to a system that comprises: (a) one or more processors; and (b) logic encoded in one or more tangible media for execution by the one or more processors and when executed operable to perform operations comprising: (i) determining a default view layout for a user, the default view layout comprising representations of table records for the user, the default view layout and representations are selected based upon a table record count for the user; (ii) generating a graphical user interface having the selected default view layout; and (iii) providing the graphical user interface to a display device.

According to some embodiments, the present technology may be directed to a graphical user interface, comprising a default view layout for a user, the default view layout comprising representations of table records for the user, the default view layout and representations are selected based upon a table record count for the user.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
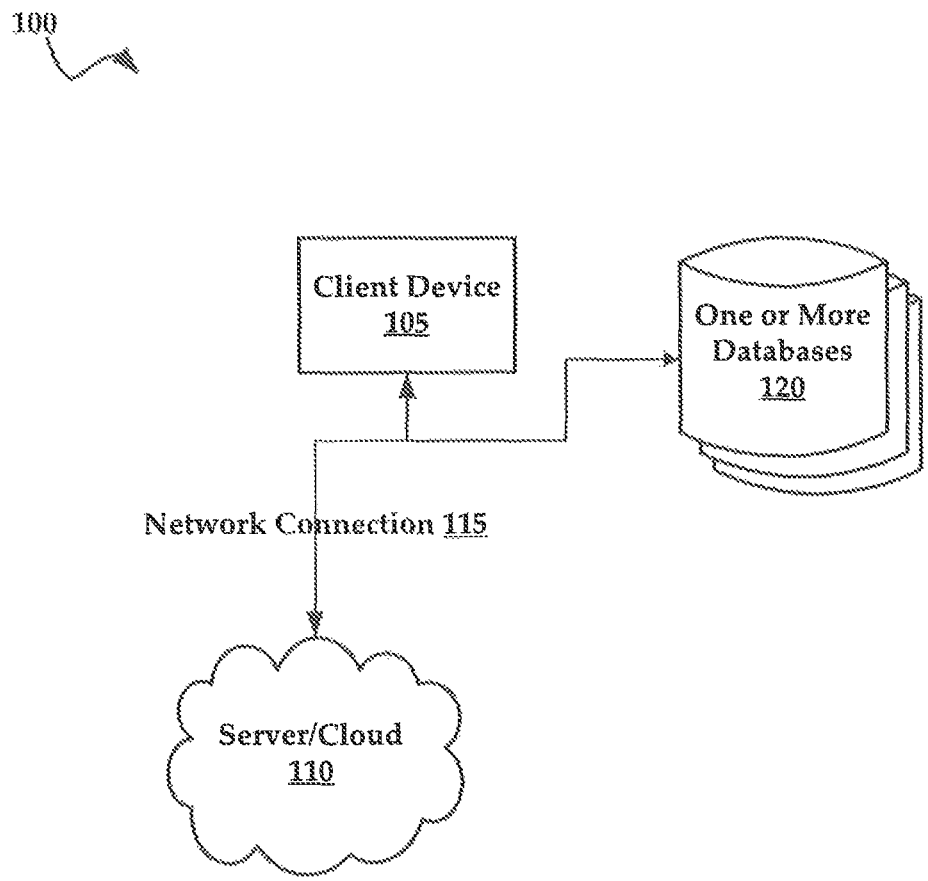
FIG. 1 is a block diagram of an exemplary architecture in which embodiments of the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology comprises systems and methods for providing efficient and focused visualization of data. The present technology may intelligently select a preferred default view layout for a user based upon their data. Additionally, the present technology provides intuitive and focused graphical user interfaces that provide intuitive layouts of data.

According to some embodiments, the present technology may generate graphical user interfaces GUIs that provide intuitive visualizations of data. For example, GUIs of the present technology may provide a more minimalist view of table records, which are typically stored in a database. These minimalist views may reduce visual complication and information oversaturation, which is common with displays of table related data. The present technology may select a default view layout for a user based upon an aggregated volume of table records located for the end user relative to a database query, also referred to as a "table record count" for the user.

GUIs of the present technology provide table control and selectively adjustable filter criteria interfaces that organize data for display in a more meaningful manner than currently available table displays. In sum, the present technology provides a framework for filtering and displaying data that is meaningful and visually appealing. According to some embodiments the GUIs of the present technology may reduce the need for paging through voluminous amounts of table data, which makes data navigation cumbersome. In some instances, the GUIs may implement infinite scrolling features as well as clearly defined end of list identifiers that help viewers easily identify the end of table data available for review. Rather than using paging, the use of infinite scrolling allows for presentation of table data within the field of view of the user without requiring the user to click through pages or utilize unwieldy page controls.

Other advantages include GUIs that provide easily distinguishable visual identifiers when filter criteria are applied to table data. More specifically, the application of filter criteria may result no data being displayed. This situation is distinguishable from instances where table records do not exist at all. Thus, it is advantageous for the system to indicate that table records exist, but that nothing has been displayed due to the application of filter criteria. Adjustments of filter criteria may result in the display of table records.

These and other advantages of the present technology are provided in greater detail with reference to the drawings.

FIG. 1 is a block diagram of an exemplary architecture 100 in which embodiments of the present technology may be practiced. According to some embodiments, the architecture 100 may comprise a client device 105, which in some instances may comprise an end user computing device, a mobile computing device, or any other device capable of displaying graphical user interfaces and allowing an end user to interact with such GUIs.

The client device 105 may be communicatively coupled with a server 110 via a network 115, which may comprise any a local area network ("LAN"), a wide area network ("WAN"), or any other private or public network, such as the Internet. The network 115 may also comprise a telecommunications network.

According to some embodiments, the server 110 may comprise any computing device which includes one or more processors and memory for storing executable instructions. This logic, when executed by the one or more processors, is operable to perform operations, including the exemplary methods described herein.

In some instances, the functions of the server 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The server 110 may communicatively couple with one or more databases 120 via the network 115. Generally, the server 110 may query the one or more databases 120 for table records and table record entries (e.g., table record information) that may be displayed to the user.

According to some embodiments, the server 110 may execute logic stored in memory to generate various GUIs which are constructed in accordance with the present technology. Exemplary GUIs may provide intuitive table controls and meaningful data display that is tailored to the needs of the viewer. In some instances, an exemplary GUI may include a default view layout, which specifies how table records and table record entries obtained from the one or more databases 120 are displayed to the user.

The server 110 may select a default view layout for a user by querying the one or more databases for an aggregate number of table records that correspond to a query for data. For example, the viewer may request that the system display table records that correspond to a set of filter criteria. Based upon the aggregate number of table records that are returned from the query (e.g., table record count), the server 110 may select a default view layout. For example, if the server 110 determines that only a few table records correspond to the query, the server 110 may select a default view layout that includes representations of the table records that fill a field of view for the viewer. The field of view is the visual space viewable by the user. In some instances the field of view for the user may be determined by evaluating the display used by the viewer. By way of example, a field of view for a laptop may be larger relative to a field of view available to a mobile device.

Knowing the available field of view of the display and the aggregate number of table records that need to be displayed, the server 110 may select how table records are formatted and displayed to the viewer. Large numbers of table records may be conveniently represented in a list format, whereas smaller numbers of table records may advantageously be represented using index card views or other non-traditional, but visually appealing, representations of table records. Additionally, the default layout type may be selected by the user. The system 110 may implement thresholds that determine when an aggregate number of table records should be displayed as a list view, as opposed to an index card view.

The user may also select the types of table record entries that are displayed to the user. This feature is particular useful in instances where table records may include dozens, if not hundreds of entries for each table record. Thus, the user may select which of the plurality of entries are useful.

In instances where the aggregate number of table records are sufficient to cause the table records to be displayed as a list, the server 110 may employ infinite scrolling, which is advantageous compared to table record lists that utilize page style controls. Page style control mechanisms, by their nature, hide table records that exist on pages other than the page currently being viewed. Thus, context and meaning for these hidden table records may be easily lost by the user.

With respect to conventional table displays, users can often get lost when clicking away from the initial table list. That is, to view pertinent data associated with a table record, the user typically clicks the table record on the list, which opens a subsequent window or view. Advantageously, the server 110 may display representations of table records in a format that is highly relevant to the needs of the user, reducing the need for the user to click on a table record to view pertinent data.

Conversely, infinite scrolling allows the user to easily navigate through all available table records. Additionally, table controls may be displayed adjacently to the representations of table records, which allow the user to retain control over the table records being displayed by retaining access to filter criteria or other display functions.

The server 110 may also implement an easily identifiable end of records indicator. For example, if the user utilizes the infinite scroll to navigate to the end of a list of table records, upon reaching the end of the list, the server 110 may display an indicator, such as a stop sign or other easily identifiable indicator. This indicator provides indication that the end of the list has been reached as opposed to other possibilities such as latency within the database, network, server, or combination thereof. Thus, if no indicator is provided, the user may assume that the server has failed to return all table records available.

In sum, the graphical user interface may provide infinite scroll and display of representations of table records when the representations of table records being displayed in a field of view are less than a total amount of table records available for display. Thus, scrolling loads additional representations of table records into the field of view of the user. Additionally, the graphical user interface comprises an indicator which signifies that there are no more additional representations of table records to display via infinite scrolling.

As mentioned above, the server 110 may allow users to apply filter criteria and query the one or more databases 120 for table records. The server 110 may also implement unique indicators that allow the user to differentiate between instances when filter criteria, which has been applied to a query has resulted in no table records being displayed, as opposed to instances where no table records exist. In the former, filter criteria may be adjusted in an effort to return table records. In the latter, no table records can be displayed because none exist. Thus, adjustments to filter criteria are futile.

The server 110 may also allow users to switch between views while maintaining filter criteria. The user may selectively switch between a list view and an index card view without removing or increasing an amount of table entry records displayed in each representation. For example, if the user is viewing table records in an index card format such that only four table record entries are displayed for each record, if the user switches to the list view, the same table record entries are displayed. Thus, switching views changes only the representations of the data.

The server 110 also provides a multi-select modality where a user can select multiple representations of table records and perform a function simultaneously on each of the table records. For example, the user may select multiple table record representations and choose to execute an action against all of the representations. In one non-limiting example, suppose the representations refer to computing devices that are subject to replication by a backup system. The representations may include devices name and protection statuses (e.g., a backup state) for the devices. By selecting several representations of devices that have protection statuses that indicate that the devices are not currently protected, the user may initiate an action against these selected devices.

Figure 2A:
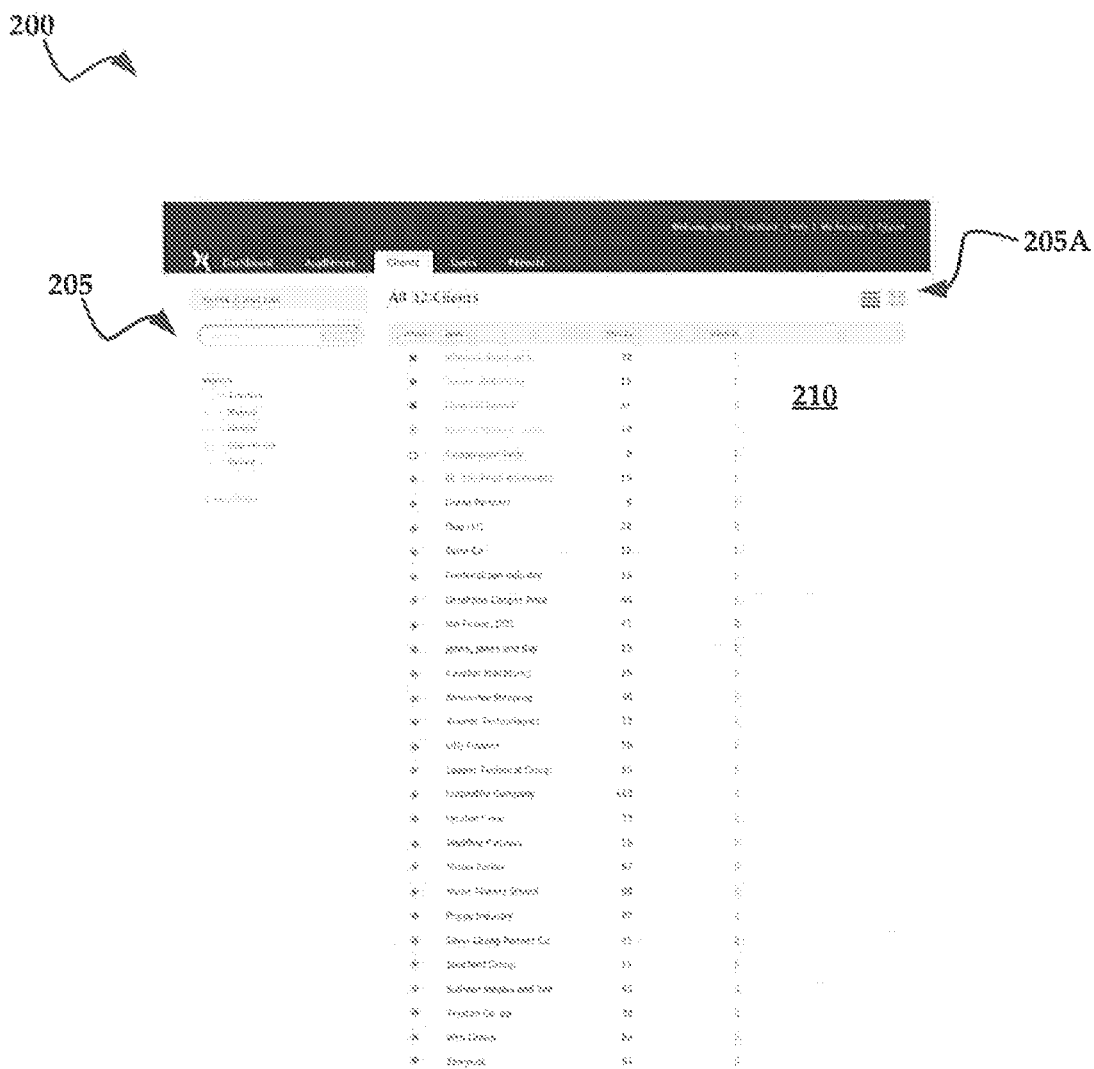
FIG. 2A is an exemplary graphical user interface for displaying representations of table records.

FIG. 2A is an exemplary graphical user interface 200 for displaying representations of table records. The GUI 200 is shown as comprising a table control interface 205 that allows a user to query records. The interface 205 also provides a plurality of selectable filter criteria that allow a user to select desired table records, which are provided in a table record listing 210. Thus, the table record listing 210 includes table records that correspond to the selected filter criteria. Again, the representation shown in this example is a list view. Also, the desired parameters selected for display for each of the table records may also be determined for the user. In this example, the system may know from past user interactions that the parameters of Devices and Services are desirable to the user. Rather than displaying each possible table record parameter, the system selects the parameters that are appropriate for the user.

Figure 2B:
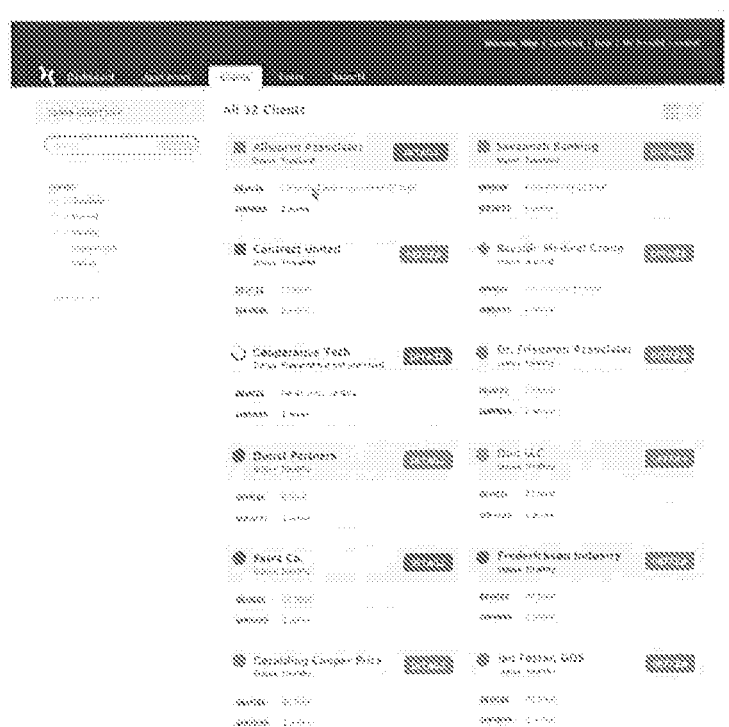
FIG. 2B is an exemplary graphical user interface for displaying representations of table records in index card format.

It noteworthy that the applied filter criteria and title displayed to the user may be separate from the content displayed to the user, inasmuch as this information may not be necessarily descriptive of the content displayed. In other words, the filter control could be considered a generic data visualization framework that supports multiple different views of the same data, for example, a tabular data visualization/representation (FIG. 2A) and an index card data visualization/representation (FIG. 2B). The icons 205A to the right of the title provide a means of switching between the different data visualizations/representations. The number of visualizations is not limited to those provided, but may include other visualizations that would be known to one of ordinary skill in the art. The filter criteria and title apply to all contained visualizations of the data.

FIG. 2B is an exemplary graphical user interface 215 for displaying representations of table records in index card format. The user interface 215 is shown as displaying the same table records as those provided in FIG. 2A, with the exception that the table records are shown in an index card format.

Figure 2C:
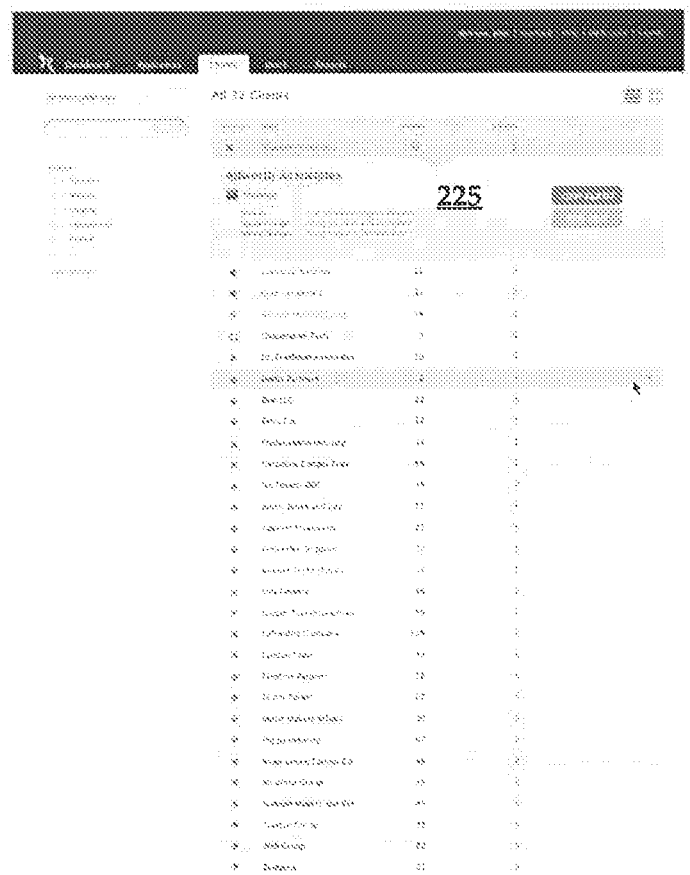
FIG. 2C is an exemplary graphical user interface for displaying representations of table records, and illustrating the selection of a table record.

FIG. 2C is an exemplary graphical user interface 220 for displaying representations of table records, and illustrating the selection of a table record. When a user selects a table record from the table record list 210 of FIG. 2A, the user is provided with a view the selected table record that is more descriptive. That is, an expanded view 225 may include more table record properties/parameters than the more simplified listing shown in FIG. 2A. Again, the system may select the table record properties to include in the expanded view 225 based upon the preferences of the user.

Figure 2D:
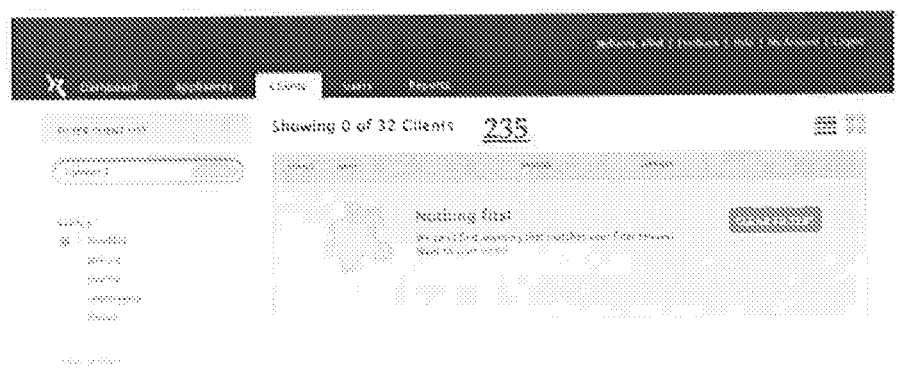
FIG. 2D is an exemplary graphical user interface that informs the user that there are no table records to display, based upon the selected filter criteria.
Figure 2E:
FIG. 2E is an exemplary graphical user interface that informs the user that there are no table records to display and illustrating when no records exist in the database.

FIG. 2D is an exemplary graphical user interface 230 that informs the user that there are no table records to display. The user interface 230 may be displayed to a user when the selected filter criteria causes the system to generate a query response with no matching records. A header 235 informs the viewer that out of a possible 32 clients, none are shown. This situation is distinguishable from instances where the user has no table records at all, which is illustrated in FIG. 2E, where a header 245 of a user interface 240 informs the viewer that no records exist.

Figure 3:
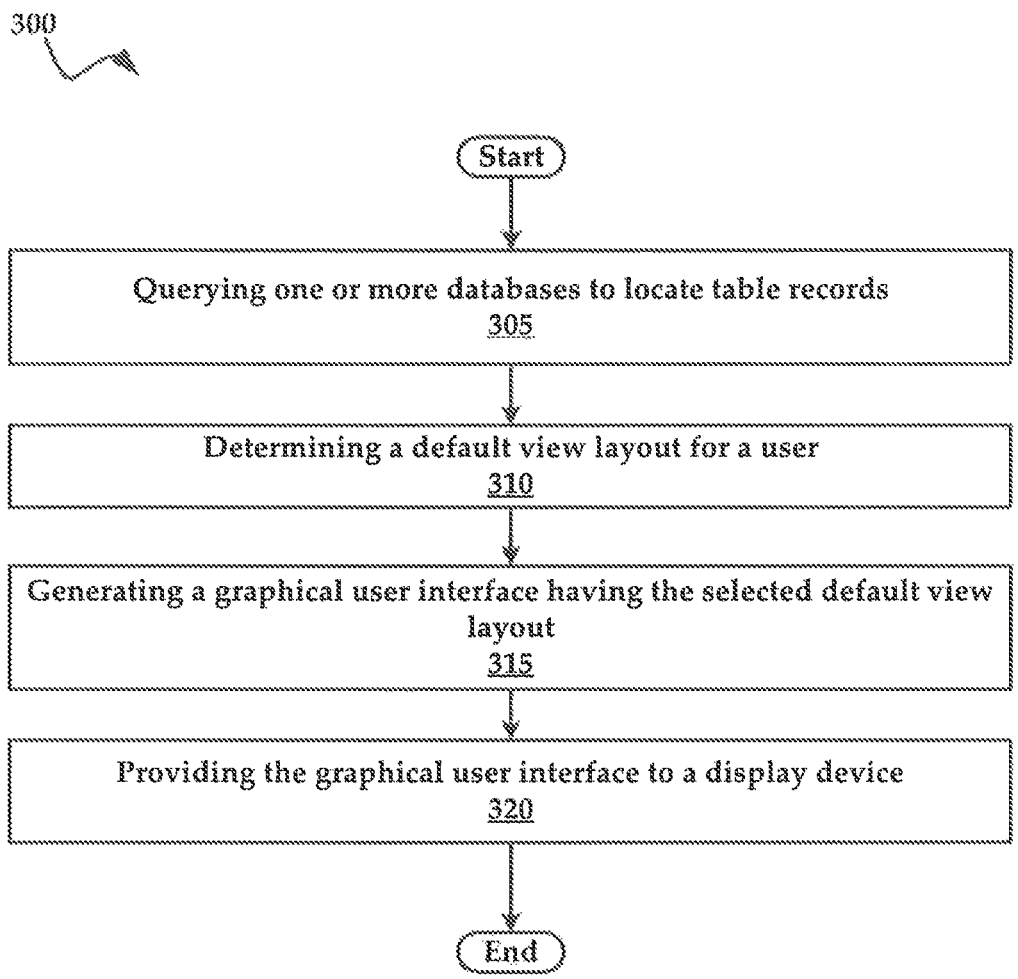
FIG. 3 is a flowchart of an exemplary method for generating a graphical user interface for displaying representations of table records.

FIG. 3 is a flowchart of an exemplary method 300 for generating a graphical user interface for displaying representations of table records. According to some embodiments, the method may include a step 305 of querying one or more databases to locate table records. The response to the query may be tailored using filter criteria. The filter criteria applied to the query depend upon the table records being queried. For example, filter criteria for querying retail products will vary greatly compared to filter criteria for querying media files.

Based upon the aggregated number of table records in the query response the method may include a step 310 of determining a default view layout for a user. The default view layout may correspond to the aggregated number of table records (e.g., table record count) returned. More specifically, the default view layout which is selected may include representations of the table records that are appropriate for the number of table records. Again, voluminous table records may require display as an infinitely scrollable list, whereas relatively few table records may be more appropriately represented in an index card style.

Once the appropriate default view layout has been determined, the method may include a step 315 of generating a graphical user interface having the selected default view layout. Again, each table record may be represented as an element in a list (list view) or represented using an index card style (index card view), or any other representation style that would be known to one of ordinary skill in the art. Again, it is noteworthy that the representations may be scaled proportionally to the table record count for the user.

Next, the method may comprise a step 320 of providing the graphical user interface to a display device.

Figure 4:
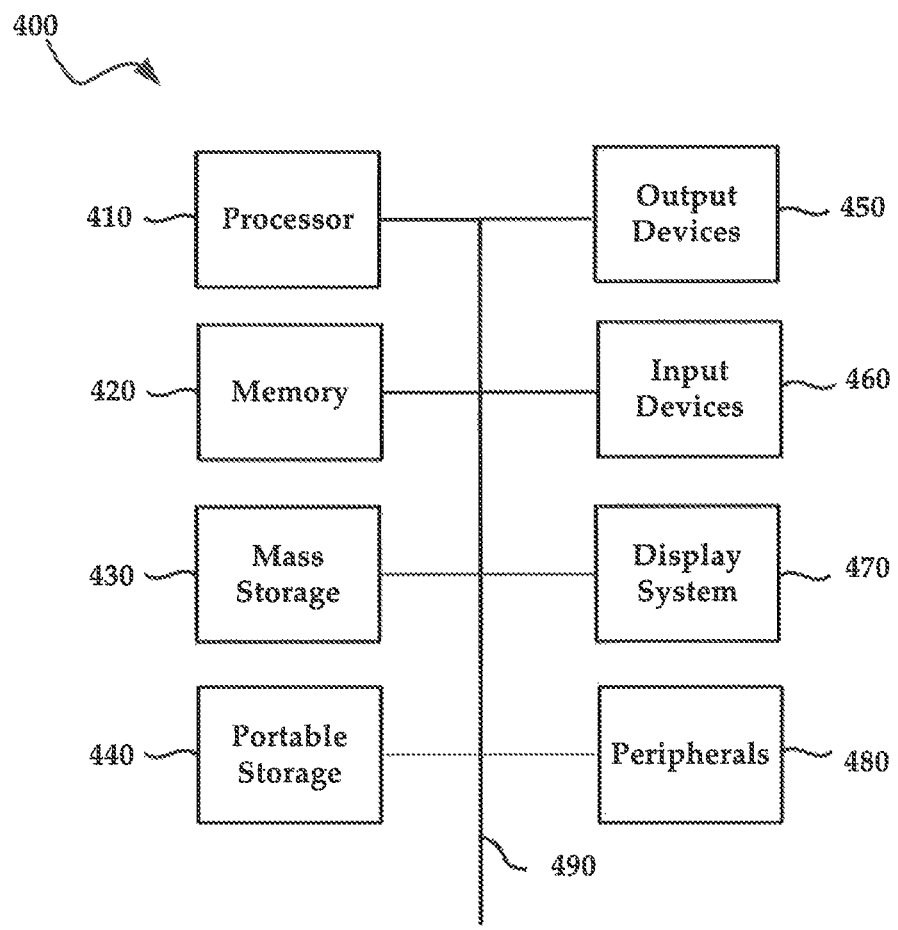
FIG. 4 illustrates an exemplary computing system that may be used to implement embodiments according to the present technology.

FIG. 4 illustrates an exemplary computing system 400 that may be used to implement an embodiment of the present systems and methods. The system 400 of FIG. 4 may be implemented in the contexts of the likes of computing systems, networks, servers, or combinations thereof. The computing system 400 of FIG. 4 includes one or more processors 410 and main memory 420. Main memory 420 stores, in part, instructions and data for execution by processor 410. Main memory 420 may store the executable code when in operation. The system 400 of FIG. 4 further includes a mass storage device 430, portable storage device 440, output devices 450, user input devices 460, a display system 470, and peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 may store the system software for implementing embodiments of the present technology for purposes of loading that software into main memory 420.

Portable storage device 440 operates in conjunction with a portable non-volatile storage medium, such as a floppy disk, compact disk, digital video disc, or USB storage device, to input and output data and code to and from the computer system 400 of FIG. 4. The system software for implementing embodiments of the present technology may be stored on such a portable medium and input to the computer system 400 via the portable storage device 440.

User input devices 460 provide a portion of a user interface. User input devices 460 may include an alphanumeric keypad, such as a keyboard, for inputting alpha-numeric and other information, or a pointing device, such as a mouse, a trackball, stylus, or cursor direction keys. Additional user input devices 460 may comprise, but are not limited to, devices such as speech recognition systems, facial recognition systems, motion-based input systems, gesture-based systems, and so forth. For example, user input devices 460 may include a touchscreen. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals device(s) 480 may include any type of computer support device to add additional functionality to the computer system. Peripheral device(s) 480 may include a modem or a router.

The components provided in the computer system 400 of FIG. 4 are those typically found in computer systems that may be suitable for use with embodiments of the present technology and are intended to represent a broad category of such computer components that are well known in the art. Thus, the computer system 400 of FIG. 4 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
   selecting a default view layout for a user, the default view layout comprising representations of table records for the user, the default view layout and the representations are selected based upon a table record count for the user, wherein when the table record count exceeds a threshold the default view is a list view and when the table record count does not exceed a threshold the default view is an index card view;
   generating a graphical user interface having the selected default view layout; and
   providing the graphical user interface to a display device.

2. The method according to claim 1, wherein the graphical user interface provides infinite scroll and display of the representations of the table records when the representations of the table records being displayed in a field of view are less than a total amount of the table records available for display, wherein scrolling loads additional representations of the table records into the field of view.

3. The method according to claim 1, wherein the graphical user interface comprises an indicator which signifies that there are no more additional representations of the table records to display via infinite scrolling.

4. The method according to claim 1, wherein the table record entries comprise device protection status information.

5. The method according to claim 1, wherein a representation of a table record comprises table record information included in the table record, wherein the table record information selected for the representation is based upon user preference.

6. The method according to claim 1, further comprising scaling a size of each of the representations of the table records based upon the table record count for the user such that as the table record count for the user increases, the representations of the table records are reduced in size.

7. The method according to claim 1, further comprising receiving a selection of a plurality of representations of the table records and performing a macro-operation on each of the representations of the table records simultaneously.

8. The method according to claim 1, further comprising selecting the table records for display using filter criteria.

9. The method according to claim 8, further comprising updating the graphical user interface using a second view layout, the second view layout comprising expanded representations of the table records for the user, the expanded representations of the table records for the user adhering to the same filter criteria.

10. A system, comprising:
    one or more processors; and
    logic encoded in one or more tangible media for execution by the one or more processors and when executed operable to perform operations comprising:
       determining an aggregate number of table records for a user;
       detecting a field of view for the user;

selecting a default view layout for a user, the default view layout comprising representations of the table records for the user, the default view layout and the representations are selected based upon the aggregate number of the table records and the field of view, wherein when the aggregate number of the table records exceeds a threshold the default view is a list view and when the aggregate number of the table records does not exceed a threshold the default view is an index card view;

generating a graphical user interface having the selected default view layout; and providing the graphical user interface to a display device.

11. The system according to claim 10, wherein the graphical user interface provides infinite scroll and display of representations of the table records when the representations of the table records being displayed in a field of view are less than a total amount of the table records available for display, wherein scrolling loads additional representations of the table records into the field of view.

12. The system according to claim 10, wherein the graphical user interface comprises an indicator which signifies that there are no more additional representations of the table records to display via infinite scrolling.

13. The system according to claim 10, wherein the table record entries comprise device protection status information.

14. The system according to claim 10, wherein a representation of a table record comprises table record information included in the table record, wherein the table record information selected for the representation is based upon user preference.

15. The system according to claim 10, wherein the logic when executed is further operable to perform operations comprising scaling a size of each of the representations of the table records based upon the table record count for the user such that as the table record count for the user increases, the representations of the table records are reduced in size.

16. The system according to claim 10, wherein the logic when executed is further operable to perform operations comprising receiving a selection of a plurality of representations of the table records and performing a macro-operation on each of the representations of the table records simultaneously.

17. The system according to claim 10, wherein the logic when executed is further operable to perform operations comprising selecting the table records for display using filter criteria.

18. The system according to claim 17, wherein the logic when executed is further operable to perform operations comprising updating the graphical user interface using a second view layout, the second view layout comprising expanded representations of the table records for the user, the expanded representations of the table records for the user adhering to the same filter criteria.

* * * * *